Aug. 15, 1939    F. R. BALCAR    2,169,210
RECOVERY OF OLEFIN OXIDES FROM GASEOUS MIXTURES
Filed Nov. 5, 1938
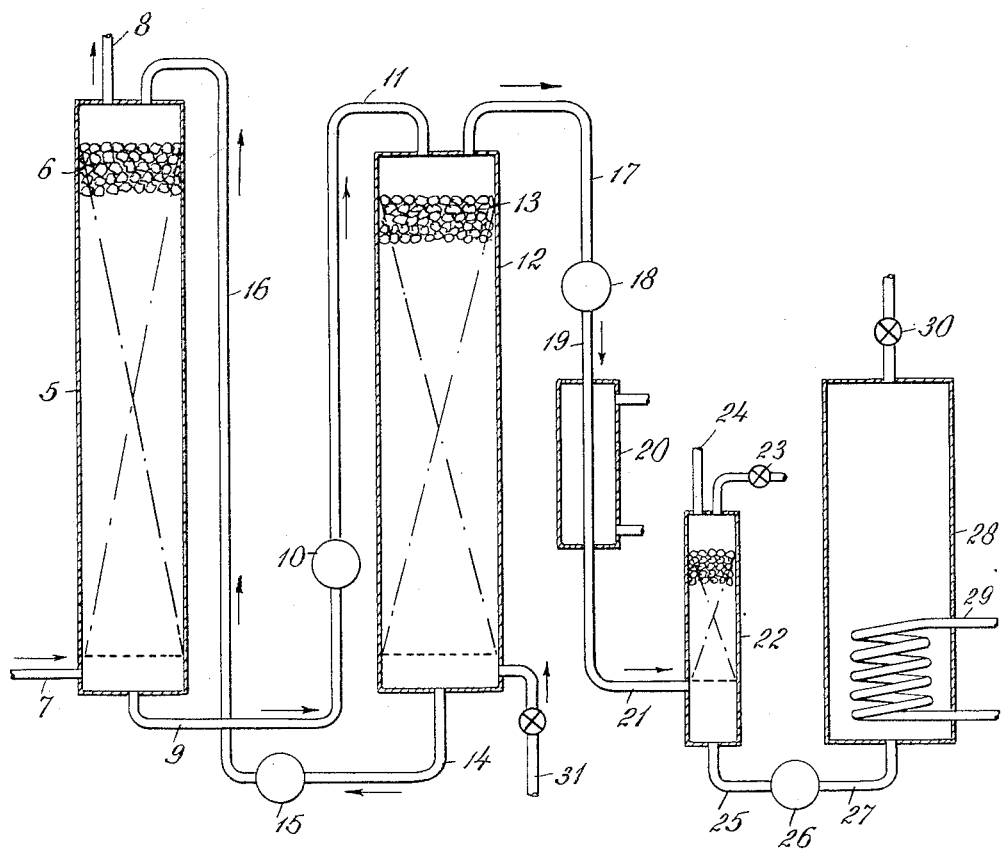
INVENTOR
Frederick R Balcar
BY
ATTORNEYS Patented Aug. 15, 1939

2,169,210

UNITED STATES PATENT OFFICE

2,169,210

RECOVERY OF OLEFIN OXIDES FROM GASEOUS MIXTURES

Frederick R. Balcar, Stamford, Conn., assignor, by mesne assignments, to U. S. Industrial Alcohol Co., New York, N. Y., a corporation of West Virginia Application November 5, 1938, Serial No. 239,172

6 Claims. (Cl. 260—348)

This invention relates to the recovery of olefin oxides from gaseous mixtures, particularly such as are produced by the direct oxidation of olefins with air or oxygen and the production of the corresponding glycols by hydrolyzing the olefin oxides.

The direct oxidation of olefins, such as ethylene, propylene and the like, results in gaseous mixtures containing relatively small amounts of the olefin oxide, together with much larger proportions of inert or diluent gases such as oxygen, nitrogen, carbon monoxide, carbon dioxide, and unoxidized olefins. The recovery of the olefin oxide from such gaseous mixtures presents numerous difficulties in respect to commercial operation, in which it is necessary to handle very large quantities of gases in order to recover the olefin oxide or its derivatives in commercially practicable quantities.

Olefin oxide may be recovered in the laboratory from a gaseous mixture containing it by passing the gaseous mixture over an absorbent such as charcoal, which removes the olefin oxide preferentially from the gaseous mixture. Alternatively, the olefin oxide may be condensed from a gaseous mixture by refrigeration, or the two methods may be combined with simultaneous cooling and absorption of the olefin oxide from the gaseous mixture. To apply such methods on a commercial scale would require very large apparatus and the heating and cooling of a large volume of absorbent material or cooling of all the gases to a very low temperature. In either case, the added cost of the ultimate product is too high to afford any prospect of commercial success under present conditions.

An alternative and more desirable method has been described in my copending application, Serial No. 156,366, filed July 29, 1937, now Patent No. 2,135,271. The preferred method described therein involves the cycling of an aqueous solution containing a hydration catalyst and glycol through a tower countercurrent to the gas containing the ethylene oxide, absorbing the ethylene oxide and converting it to glycol by hydration, after which the solution is passed again through the tower, the absorption and hydration being continued until the solution contains sufficient glycol to warrant the separation of glycol therefrom.

The method described above is simple and effective and can be operated advantageously for the recovery of commercial quantities of ethylene oxide in the form of glycol. However, in its operation, particularly when an acid hydration catalyst is used, a number of difficulties are encountered which add appreciably to the cost of the recovery operation as a whole.

Due to the fact that the absorption and hydration is carried out at somewhat elevated temperatures, the quantity of the absorbing liquor which must be cycled to obtain substantially complete recovery of the olefin oxide is relatively large. Furthermore in the case of an acid hydration catalyst, the pumping equipment, and the absorption and hydration system must be necessarily of acid-proof construction to avoid serious corrosion of the various parts of the apparatus.

Another difficulty is encountered in the recovery of the glycol from the aqueous solution containing the acid hydration catalyst. Since the acid is neutralized before concentrating the glycol solution withdrawn from the system, a substantial quantity of salt is formed which accumulates in the concentration stills and interferes with the operation of that portion of the apparatus in which the salt crystallizes out. And again, in the preferred method of operation of that recovery process, in which an acid hydration catalyst is used, both the acid and the alkaline material used in neutralizing the acid must be supplied continuously, involving an expenditure for raw materials.

It is the object of the present invention to provide a method for recovering olefin oxides from gaseous mixtures which is also simple and effective, and which eliminates for the most part the difficulties encountered in the method previously described.

It is known that water is an effective solvent for absorbing olefin oxides from gaseous mixtures. However, when the olefin oxide to be recovered is present to the extent of only about 1 or 2% in a mixture containing other gases such as nitrogen, oxygen, carbon dioxide, etc., the concentration of olefin oxide in the absorbing solution leaving the absorber is very low, particularly if the absorber is operated so as to obtain complete absorption of the olefin oxide. As a result the heat required to boil out the ethylene oxide in a conventional recovery system using water as a solvent would be so great that the operation of the process would very likely be less economical than the process using, for example, charcoal as absorbent, and much less economical than my alternative method using the aqueous liquor containing a hydration catalyst as absorbent and continuously hydrating the olefin oxide to glycol within the absorption cycle.

I have found, however, that water may be used as a solvent for recovering olefin oxides from very dilute gaseous mixtures, and the excessive heat requirement may be eliminated by operating the recovery system in such a manner that the necessity for changing the temperature of the large quantity of water associated with the olefin oxide in the solution leaving the absorber is avoided. According to the present invention this may be accomplished by expelling the dissolved olefin oxide from the solution by means of steam passed countercurrent to a stream of the solution containing the dissolved olefin oxide. Contact between the steam and the olefin oxide solution may be obtained in the usual manner by introducing the solution into the top of a packed tower, and passing the steam upwardly through the tower while the solution travels downwardly, being freed of its olefin oxide content by the action of the steam. In order to avoid heating the absorption liquor, the tower is designed to maintain the entering steam at a pressure so low that no appreciable condensation of the steam in contact with the absorbing liquor is obtained. Since the temperature of the absorbing liquor is not altered appreciably by this operation, the heat requirement of the present process becomes relatively small and insignificant. The olefin oxide mixed with the steam leaves the desorbing or expelling tower and is compressed to atmospheric pressure, and the steam is then condensed, leaving the olefin oxide in high concentration in the vapor state.

To effect recovery of the olefin oxide as glycol I then redissolve it in water forming a solution containing a concentration of olefin oxide many times greater than its concentration in the original absorption liquor, and subject the solution thus formed to a temperature between about 100° and 200° C. in a vessel designed to withstand the corresponding pressure to effect hydration of the olefin oxide. I have found that under these conditions hydration of the olefin oxide will proceed at a satisfactory rate, and the necessity of supplying a hydration catalyst, for example, sulphuric acid, and thereafter supplying alkaline material to neutralize the acid before concentration of the resulting glycol solution is avoided. At the same time the accumulation of a salt in the concentrating equipment is avoided, and the recovery system as a whole can be built using ordinary materials of construction, since no acid is present in any part of the system.

The method as described affords a simple and effective procedure for the treatment of a gaseous mixture containing relatively small proportions of olefin oxides, combining the advantages of a relatively small liquor cycle in the absorption system, the elimination of excessive heat requirements, and the absence of corrosive materials in the liquids used for absorbing and hydrating the recovered olefin oxides.

Referring to the accompanying drawing which illustrates the preferred embodiment of the apparatus, 5 indicates a tower containing the packing 6 adapted to provide contact between the liquid and gas entering the tower. The gaseous mixture containing the olefin oxide enters the tower 5 through pipe 7 and passes upwardly in contact with the absorbent entering the top of the tower through the pipe 16. During its passage through the tower the gas is freed from olefin oxides after which it leaves the tower through pipe 8. The liquid containing the olefin oxide leaves the tower and by means of the pump 10 is conducted through the pipe 11 to the top of the tower 12 in which it flows downwardly over the packing 13. During its passage through the tower 12 the liquid comes in contact with steam entering the tower through the pipe and valve 31, thereby being freed of its olefin oxide content. The liquid leaves the tower 12 through the pipe 14 and is delivered by means of the pump 15 and pipe 16 to the top of the tower 5.

The pump 18 removes the steam and olefin oxide from the tower 12 through the pipe 17 so as to maintain the pressure of the steam so low that no appreciable condensation of the steam within the tower takes place. This is accomplished by maintaining the pressure within the tower 12 below atmospheric pressure, that is, at a pressure from a fraction of one pound to five pounds absolute and preferably not exceeding seven pounds absolute. The pump 18 readily maintains this condition.

The olefin oxide mixed with steam is compressed by means of the pump 18 to atmospheric pressure and passes through the pipe 19 and cooler 20 to the tower 22 where the concentrated olefin oxide is reabsorbed in water, delivered to the packed tower 22 by means of valve and pipe 23. If desired, the olefin oxide may be recovered directly and used for any purpose or it may be converted to glycol as hereinafter described.

The more concentrated solution of olefin oxide in water leaves the tower 22 through the pipe 25 and by means of the pump 26 is forced under pressure through pipe 27 into the hydrating chamber 28 where it is heated by means of the heating coil 29. Any small amounts of nitrogen, oxygen, carbon dioxide, or other gases not reabsorbed in the tower 22 pass out through the pipe 24. After hydration of the olefin oxide is completed in the chamber 28, the solution now containing glycol and other hydration products formed equivalent to the amount of its original olefin oxide content leaves the chamber through valve and pipe 30.

The temperature of the liquor passing through the tower 5 is held preferably near room temperature or somewhat higher if desired. It is important that the temperature in the tower 12 be as nearly as possible the same as that in tower 5, to avoid the consumption or transfer of large quantities of heat. By maintaining the reduced pressure in the tower 12, the olefin oxide can be separated without substantial increase in the temperature and consequent expenditure of heat.

As an example of the operation of the recovery system as a whole, I pass about 175 cubic feet per hour of gas containing about 3 cubic feet of ethylene oxide, the balance being for the most part oxygen, nitrogen and carbon dioxide, through a scrubber maintained at a temperature of about 25° to 30° C., in which the ethylene oxide is absorbed by water. On expelling the dissolved ethylene oxide in the manner previously described I obtain substantially all the ethylene oxide originally present in the gas as a gaseous product containing 80% or more by volume of ethylene oxide which can be recovered as such. I may, however, form an aqueous solution containing ethylene oxide sufficient to give 8 to 10% glycol after hydration, and hydrate the ethylene oxide in the solution in the absence of a catalyst by heating it to about 150° C. for a period of several hours, obtaining a solution of glycol in water, containing a small proportion of di-ethylene glycol, but little or no unhydrated ethylene oxide.

The details of the apparatus as described herein are not essential to the invention, and various changes may be made in the form and construction thereof, as well as in the procedure, without departing from the invention or sacrificing any of its advantages.

I claim:

1. In the recovering of an olefin oxide from dilute gaseous mixtures, the steps of absorbing the olefin oxide in an aqueous solvent and subjecting the solvent to steam at a sub-atmospheric pressure so low that the temperature of the solvent is not substantially altered.

2. In the recovering of ethylene oxide from dilute gaseous mixtures, the steps of absorbing the ethylene oxide in an aqueous solvent and subjecting the solvent to steam at a sub-atmospheric pressure so low that the temperature of the solvent is not substantially altered.

3. The method of recovering an olefin oxide from dilute gaseous mixtures which comprises absorbing the olefin oxide in an aqueous solvent and passing steam therethrough while maintaining a subatmospheric pressure so low that the temperature of the solvent is not substantially altered.

4. The method of recovering ethylene oxide from dilute gaseous mixtures which comprises absorbing the ethylene oxide in an aqueous solvent and passing steam therethrough while maintaining a subatmospheric pressure so low that the temperature of the solvent is not substantially altered.

5. The method of recovering an olefin oxide from dilute gaseous mixtures which comprises absorbing the olefin oxide in an aqueous solvent, maintaining the solvent at a subatmospheric pressure of from a fraction of one pound to five pounds absolute and subjecting the solvent to steam at the reduced pressure.

6. The method of recovering ethylene oxide from dilute gaseous mixtures which comprises absorbing the ethylene oxide in an aqueous solvent, maintaining the solvent at a subatmospheric pressure of from a fraction of one pound to five pounds absolute and subjecting the solvent to steam at the reduced pressure.

FREDERICK R. BALCAR.